US008970850B2

(12) United States Patent  
Yan et al.

(10) Patent No.: US 8,970,850 B2
(45) Date of Patent: Mar. 3, 2015

(54) METHOD AND APPARATUS FOR SURFACE PROFILOMETRY

(71) Applicant: University of New Brunswick, Fredericton (CA)

(72) Inventors: Dongbo Yan, Vancouver (CA); Kecheng Li, Fredericton (CA)

(73) Assignee: University of New Brunswick, Fredericton (CA)

( * ) Notice: Subject to any disclaimer, the term of this patent is extended or adjusted under 35 U.S.C. 154(b) by 91 days.

(21) Appl. No.: 13/795,322

(22) Filed: Mar. 12, 2013

(65) Prior Publication Data

US 2014/0168660 A1 Jun. 19, 2014

Related U.S. Application Data

(60) Provisional application No. 61/737,566, filed on Dec. 14, 2012.

(51) Int. Cl.
G01B 11/02 (2006.01)
G01B 11/24 (2006.01)
G01B 9/02 (2006.01)

(52) U.S. Cl.
CPC ........ *G01B 11/2441* (2013.01); *G01B 9/02064* (2013.01); *G01B 9/02057* (2013.01); *G01B 9/0209* (2013.01); *G01B 9/02083* (2013.01)
USPC ...................................................... 356/511

(58) Field of Classification Search
USPC ........................................ 356/497, 511, 516
See application file for complete search history.

(56) References Cited

U.S. PATENT DOCUMENTS

| 5,133,601 | A | 7/1992 | Cohen et al. |
| 5,398,113 | A | 3/1995 | de Groot |
| 5,633,715 | A | 5/1997 | Ai et al. |
| 5,953,124 | A | 9/1999 | Deck |
| 6,028,670 | A | * | 2/2000 | Deck ............................. 356/497 |
| 6,195,168 | B1 | * | 2/2001 | De Lega et al. ............... 356/497 |
| 6,486,962 | B1 | * | 11/2002 | Telschow et al. ............ 356/503 |
| 7,106,454 | B2 | * | 9/2006 | De Groot et al. ............ 356/511 |
| 7,119,907 | B2 | 10/2006 | Ge |
| 7,583,386 | B2 | * | 9/2009 | Freischlad et al. ........... 356/497 |
| 2009/0180124 | A1 | 7/2009 | Chen et al. |
| 2010/0104141 | A1 | 4/2010 | Kmiecik et al. |
| 2012/0026085 | A1 | 2/2012 | McEldowney |

OTHER PUBLICATIONS

Y. Sun, et al., "Autofocusing in Computer Microscopy: Selecting the Optimal Focus Algorithm," Microsc. Res. Tech. 65 (3): 139-149, Oct. 2004.

(Continued)

*Primary Examiner* — Michael A Lyons
(74) *Attorney, Agent, or Firm* — Hill & Schumacher

(57) ABSTRACT

Methods of performing surface profilometry are provided. A low coherence light beam is scanned relative to a sample surface. The intensity of interference fringes generated by the interference of a sample beam and a reference beam are recorded by an image sensor. Variations of light intensity around each pixel are calculated in terms of variance or standard derivation. The peak position of variance on a particular location along vertical scan direction is identified as the scan position corresponding to zero optical path difference between the reference and measuring beams. A topography map (height map) may be generated using the relative scanning position where zero optical path difference occurs at each location on sample surface.

23 Claims, 15 Drawing Sheets

(56) References Cited

OTHER PUBLICATIONS

L. Shapiro & G. Stockman, "Computer Vision," pp. 137, 150, 160 N.p.: Prentice Hall (2001).

J. Wyant, "Computerized Interferometric Measurement of Surface Microstructure," Proc. SPIE 2576, Inter. Conf. Optic. Fabrication. Test., pp. 122-130 (1995).

F. Groen, et al., "A Comparison of Different Focus Functions for use in Autofocus Algorithms," Cytometry 6(2): 81-91, Mar. 1985.

B. Clarke & W. Charman, "Macro-Interferometry of Paper Surfaces," J. Phys. E: Sci Instru. 22(3): 162-166 (1989).

E. Alarousu, "Low Coherence Interferometry and Optical Coherence Tomography in Paper Measurements, " (Thesis 2006).

Wygant, R.W., Pigment Coating and Surface Sizing of Paper, Chapter 34 (Measurement and Effects of Paper Coating Structure), pp. 637-661, edited by Esa Lehtinen, Finnish Paper Engineers' Association and TAPPI, Jun. 2000.

* cited by examiner

METHOD AND APPARATUS FOR SURFACE PROFILOMETRY

CROSS-REFERENCE TO RELATED APPLICATION

This application claims priority to U.S. Provisional Application No. 61/737,566, titled "METHOD AND APPARATUS FOR SURFACE PROFILOMETRY" and filed on Dec. 14, 2012, the entire contents of which is incorporated herein by reference.

BACKGROUND

The present disclosure relates to surface profilometry, and more particularly, the present disclosure relates to interferometric surface profilometry.

White-light scanning interferometry is a non-contact optical method that is widely used for measuring three-dimensional surface profiles of materials with microns or sub-microns resolution. Many algorithms and methods have been proposed for determining the peak position of an interferogram and improving the accuracy of the detection. Most of these algorithms, such as methods disclosed in U.S. Pat. Nos. 7,119,907, 5,398,113, 5,953,124, and 5,133,601, require that clear and high contrast of an interferogram be present.

Unfortunately, such methods often fail when applied to diffusely scattering surfaces, such as paper surfaces. Paper is made of various types of pulp fibers, which are separated to individual fibers from wood or other fiber resources through chemical or mechanical processes or a combination of both. The fiber wall of native plant fibers consists of a variety of materials. Cellulose is the major structural component of the cell wall of wood fibers, which have a high tendency to form intra- and intermolecular hydrogen bonds and thus aggregate together into microfibrils, a crystalline, filamentous material. The other compositions of wood fiber include lignin, an extensively branched, three-dimensional, amorphous polymer, and hemicelluloses, which are partially paracrystalline polymers of a variety of molecular sizes. Those components are organized layer by layer, thus the fiber wall is typically a non-continuous, layered structure that contains many interfaces. These internal interfaces behave as scattering centers. Therefore, diffuse reflection is the major type of light reflection from fiber surfaces, which implies that all the light that was sent out is returned in all directions rather than at just one angle as in the case of specular reflection.

The lack of visibility in the white light interferogram for such diffuse surfaces renders simple processing techniques ineffective in determining the peak position in the interferogram. In order to overcome this problem, complex algorithms have been developed for processing the interferogram in order to infer the surface location. Unfortunately, the complexity of these algorithms place high demands on the processing power of the computing system employed, often rendering such solutions expensive and overly cumbersome for many applications.

SUMMARY

According to this disclosure, the surface profile measuring method for measuring paper surface is achieved by producing interference images using a two beam interferometer apparatus. Low coherent light from one broad band light source is divided into two light components, reference light beam and measuring light beam. The measuring light beam irradiates the sample surface, and the reflected light from the sample surface interferes with the reference light to obtain interference fringes. The light intensities of interference fringes generated on the sample surface are recorded by an image sensor array through varying optical path of the measuring light beam along the optical axis. Variations of light intensity around each pixel are calculated in terms of variance or standard derivation. The peak position of variance on a particular location along the vertical scan direction is considered the scan position that zero optical path difference between reference and measuring beams occurs. A topography map (height map) can be generated using the relative scanning position where zero optical path difference occurs at each location on the sample surface.

Accordingly, in one aspect, there is provided a method of calculating a zero optical path difference position associated with a selected pixel of a white light interferometry system when measuring a sample surface, the method comprising:

a) directing a white light beam onto the sample surface and scanning the white light interferometry system to vary an optical path difference between a reference beam and a reflected beam while measuring interference images obtained based on interference between the reflected beam and the reference beam;

b) calculating, for a plurality of the white light interference images, the variance of the interference intensity among pixels neighbouring the selected pixel;

c) processing the variance values to obtain a position associated with a peak variance; and d) associating the position of peak variance with the zero optical path difference position.

In another aspect, there is provided a method of processing interference images from a white light scanning interferometer to determine a zero optical path difference position associated with a selected pixel, the method comprising:

calculating, for a plurality of the white light interference images obtained along a scanning direction, the variance of the interference intensity among pixels neighbouring the selected pixel;

processing the variance values to obtain a position associated with a peak variance; and associating the position of peak variance with the zero optical path difference position.

In another aspect, there is provided an optical apparatus for measuring a surface profile, the apparatus comprising:

a scanning white light interferometer; and a processor configured to:

a) receive interference images from the scanning white light interferometer;

b) calculate, for a plurality of the white light interference images obtained along a scanning direction, the variance of the interference intensity among pixels neighbouring a selected pixel;

c) process the variance values to obtain a position associated with a peak variance; and d) associate the position of peak variance with the zero optical path difference position.

A further understanding of the functional and advantageous aspects of the disclosure can be realized by reference to the following detailed description and drawings.

BRIEF DESCRIPTION OF THE DRAWINGS

Embodiments will now be described, by way of example only, with reference to the drawings, in which.

DETAILED DESCRIPTION

Various embodiments and aspects of the disclosure will be described with reference to details discussed below. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

As used herein, the terms, "comprises" and "comprising" are to be construed as being inclusive and open ended, and not exclusive. Specifically, when used in the specification and claims, the terms, "comprises" and "comprising" and variations thereof mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein.

As used herein, the terms "about" and "approximately", when used in conjunction with ranges of dimensions of particles, compositions of mixtures or other physical properties or characteristics, are meant to cover slight variations that may exist in the upper and lower limits of the ranges of dimensions so as to not exclude embodiments where on average most of the dimensions are satisfied but where statistically dimensions may exist outside this region. It is not the intention to exclude embodiments such as these from the present disclosure.

In conventional two-beam interferometry for the topographic measurement of a surface profile, an incident light beam is divided into two beams of equal intensity, where one beam is directed onto a reference mirror and the other beam is directed onto the sample surface, and optical path difference (the difference in optical distances) between the two reflected beams is determined based on the measured interferogram. An interferogram at a particular location can be acquired by recording light intensity of the combined beam while varying the optical path difference of two beams, which is used for determining the relative height of the sample surface at this location.

When applied to diffusively reflective surfaces, such as paper or paper-like materials, the intensity of the light beam reflected from the surface is much weaker than the reference beam. The interferogram is therefore much weaker than that obtained for specular or near-specular reflecting surfaces, such as polished metals, and an interferogram with a clearly identifiable peak is not observed. Accordingly, such diffusively reflective surfaces are problematic for the conventional scanning white light interferometry analysis method, which requires a relatively high contrast interferogram.

Figure 1:
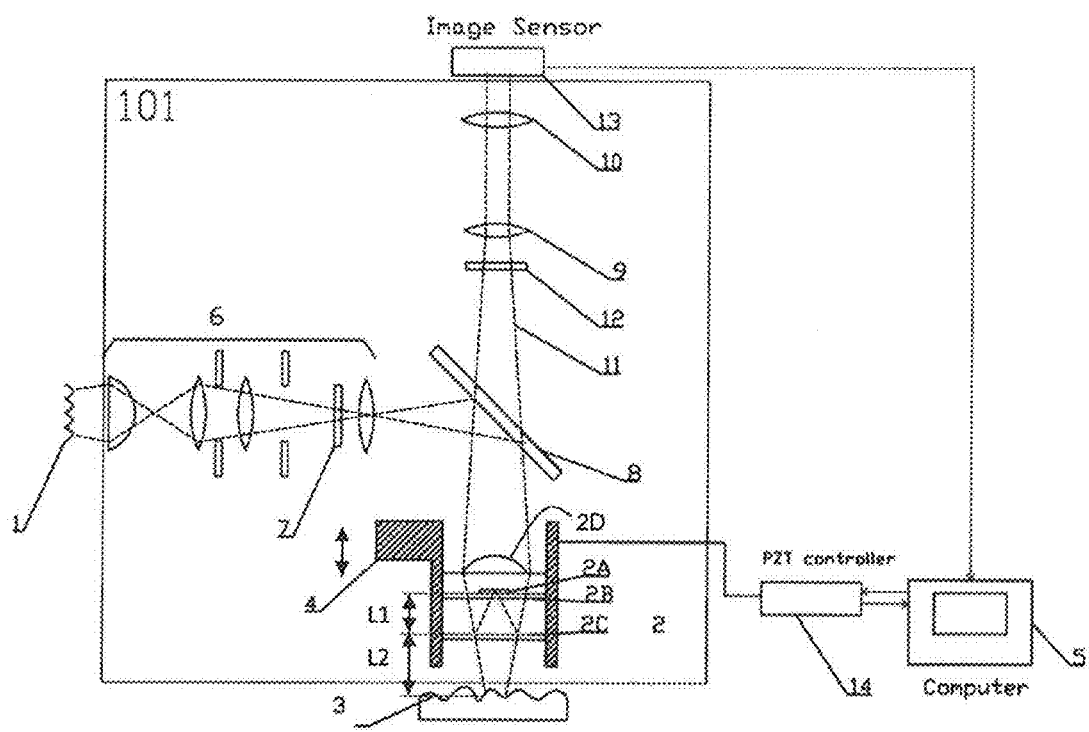
FIG. 1 is a diagram of a conventional interference microscope.

A conventional scanning white light interferometry surface profile measuring apparatus is shown in FIG. 1. Microscope 101 includes Mirau interferometer 2, beam splitter 8, epi-illuminator 6, tube lens 9, projective lens 10, polarizer 7, polarizer analyzer 12, and 2D CCD image sensor array 13. Mirau interferometer 2 is supported by piezoelectric transducer 4, and includes reference mirror 2A on glass plate support 2B, beam splitter 2C, and objective lens 2D. The piezoelectric transducer is mounted on the microscope nosepiece 4. The vertical position of Mirau interferometer 2 (or Z position, scan position) is controlled by PZT controller 14, which receives instructions from computer 5 and sends back the current position of PZT to computer 5.

White light from broadband light source 1 irradiates surface 3 of the sample. The beam reflected from surface 3 and the beam reflected from the reference mirror 2A propagate through Mirau interferometer 2 and form interference beam 11. Interference beam 11 passes through beam splitter 8, polarizer analyzer 12, tube lens 9 and projection lens 10, forming an interference image on the sensor plane of image sensor 13. The image is detected by image sensor 13 and recorded by computer 5 for display and/or analysis. As the interferometer is moved along the vertical (z) direction by piezoelectric transducer 4, the intensity of the light detected at a pixel of image sensor 13 will vary in accordance with the change in the interference fringes, producing an interferogram.

Figure 2A:
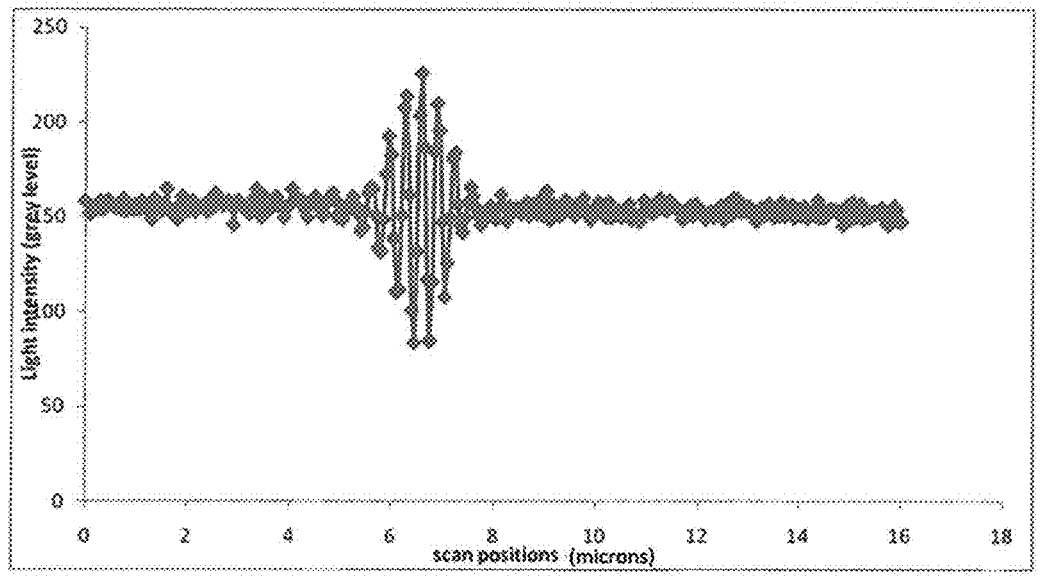
FIGS. 2 (a) to (c) show a plot of an example interferogram obtained from a smooth surface (plotted for a single pixel of a two dimensional image), generated when scanning the surface with a white light interferometric apparatus using conventional processing methods, showing (a) the interferogram, (b) the rectified interferogram, and (c) the smooth rectified interferogram.

FIG. 2(a) shows an interferogram (for one pixel in a 2D array) obtained using the aforementioned apparatus for the measurement of a smooth surface (the experimental implementation of the apparatus included a 10× Mirau interferometer microscope objective, a 50 W halogen lamp, a 100 um range PZT scanner, and a CCD digital camera). A coherence peak occurs at the position along the scan path Z of zero optical path difference, where L1 equals to L2 in FIG. 1. Since different locations on the sample surface have different relative heights, these locations will have coherence peaks at different scan positions along the scan path. The surface profile data can be generated using the relative positions of the coherence peaks of different locations of the sample surface.

Figure 2B:
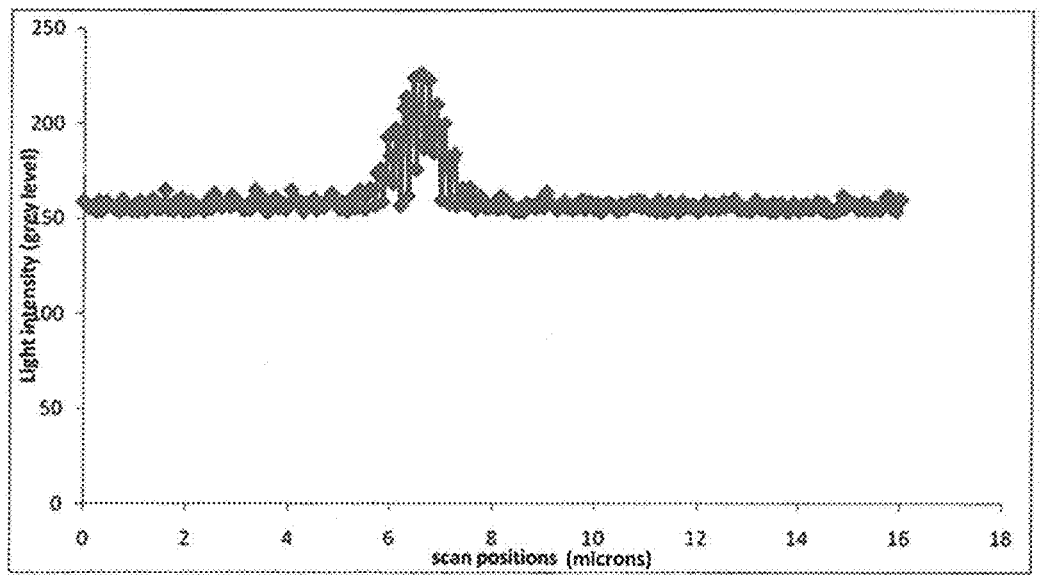
Figure 2C:
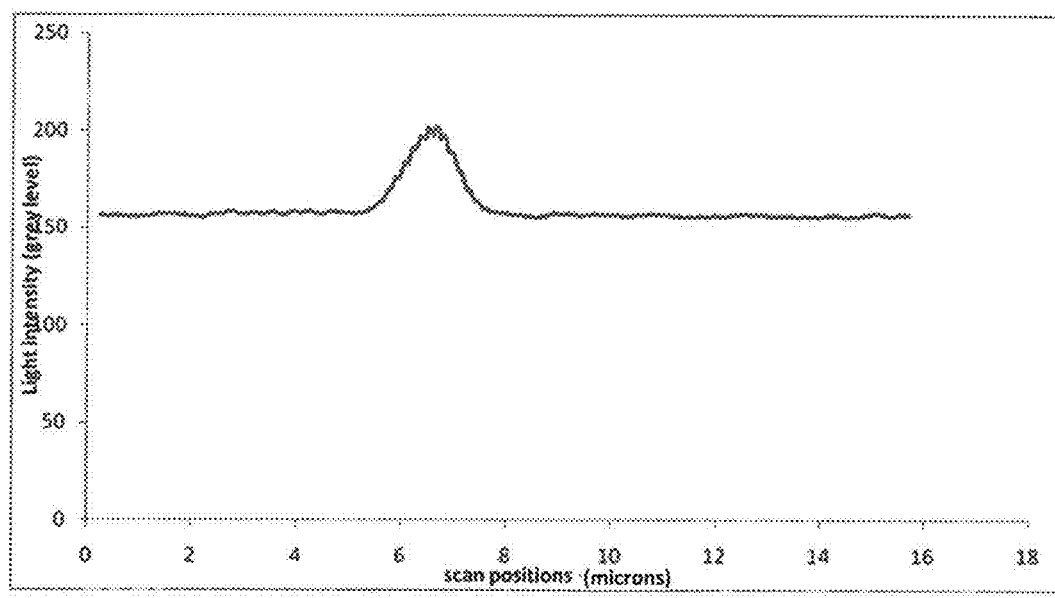

The interferogram shown in FIG. 2(a) may be processed in order to determine the surface height. An example method of processing the interferogram is as follows. The interferogram is rectified to generate the waveform shown in FIG. 2(b). The rectified waveform is then smoothed into the waveform shown in FIG. 2(c). The height in this location is determined from the peak position of the smoothed waveform, for example, as disclosed in U.S. Pat. Nos. 7,119,907, 5,133,601, or, for example, by fitting the interferogram with an envelope function for peak position determination, as disclosed in U.S. Pat. No. 7,199,907. According to such methods, an interferogram (as shown in FIG. 2(a) must be obtained at each pixel base on which the optical path difference may be possibly determined.

When using scanning white light interferometry for the measurement of surfaces with high spectral reflection, clear interference fringe patterns are formed and may be captured by an image sensor with high contrast, as illustrated in FIG. 2(a). Unfortunately, as noted above, this method of processing an interferogram from white light is typically problematic for diffusely reflective surfaces. Indeed, when measured on surfaces for which spectral reflectivity is low, such as paper surfaces, clear interference fringe patterns are generally not observed, and interference may only be formed in some particular locations on the surface, where some degree of specular reflection occurs.

Figure 3:
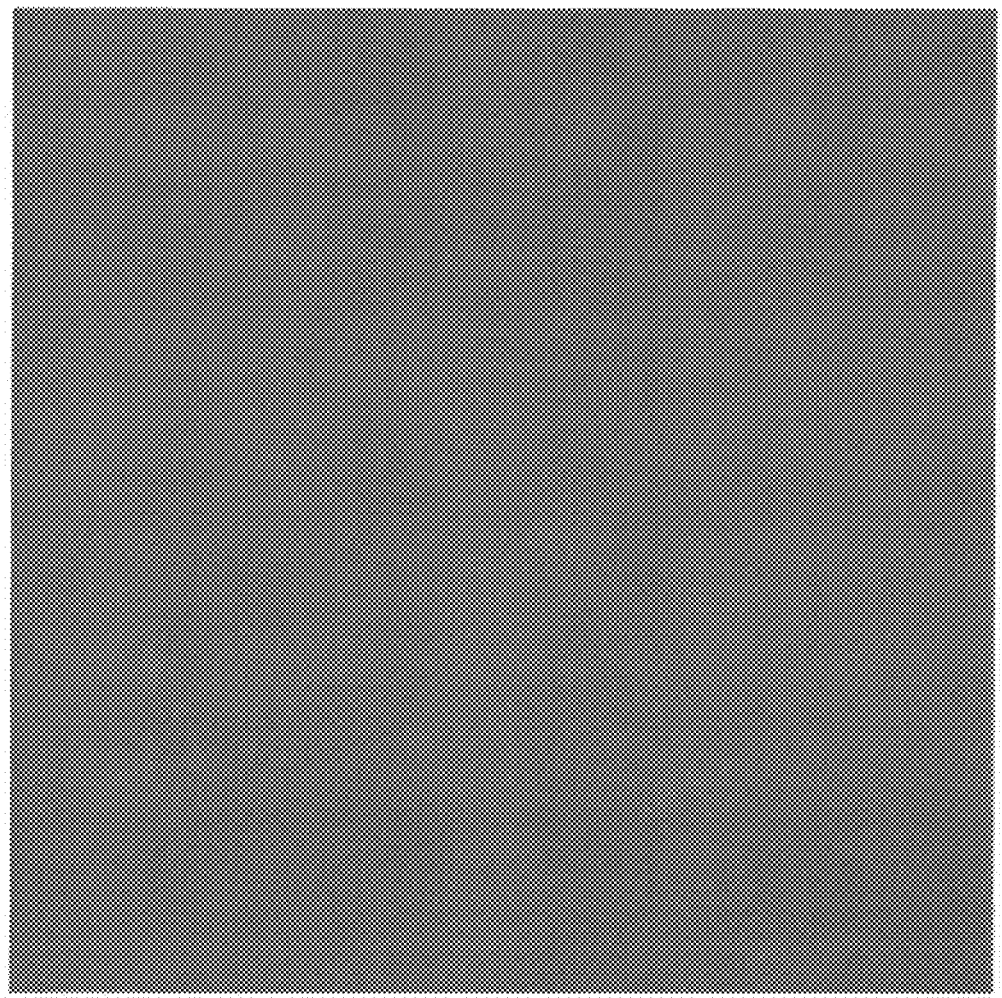
FIG. 3 shows an image of a printing paper obtained with a white light interference microscope, where interference is only observed in a few local regions where some degree of specular reflection is present.

This failure of conventional scanning white light interferometric methods for diffusely reflective surfaces is demonstrated in FIG. 3, which plots a 2D interferogram based on measurements made of a paper surface (the paper was a sheet of commercial office copying paper). Although some interference features are visible in the image at several locations, the signal-to-noise ratio of the interferogram for most of the area is too low to compute the location of the surface.

Figure 4:
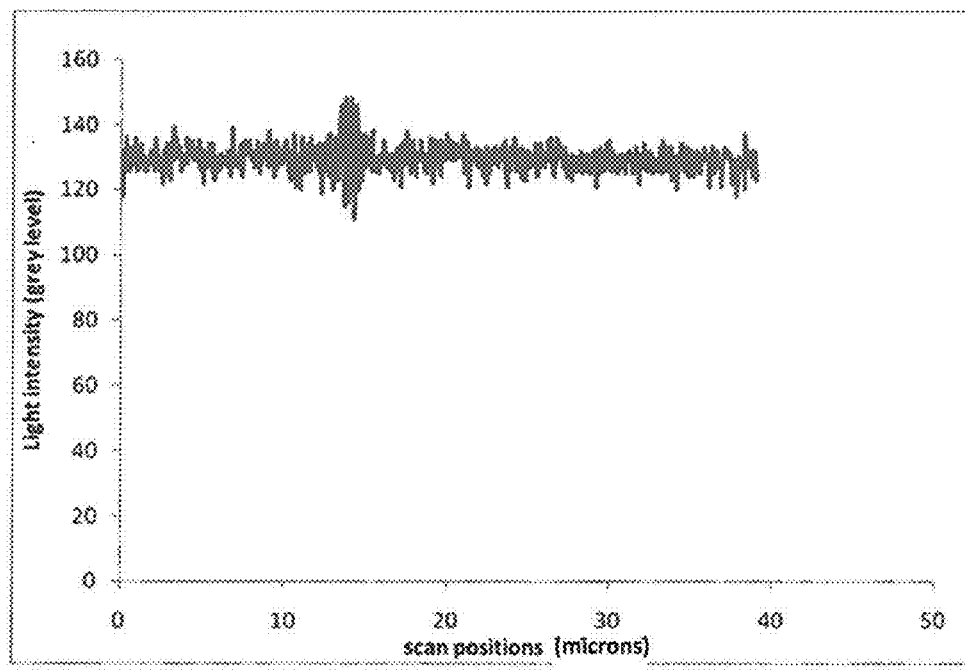
FIG. 4 shows a single-pixel interferogram of one location on a paper surface, obtained for a position at which some specular reflection is present, where the interferogram exhibits a moderate contrast.

FIG. 4 shows an interferogram measured at a location on the paper surface where some specular reflection was present, for which moderate fringe contrast was visible. The interferogram was obtained by plotting the light intensity of a selected pixel at each scanning position along the scanning direction (in this case, the optical axis of the interferometer). Interference fringes corresponding to an optical path difference of zero are visible in the interferogram at a scan position of approximately 13 microns.

Figure 5:
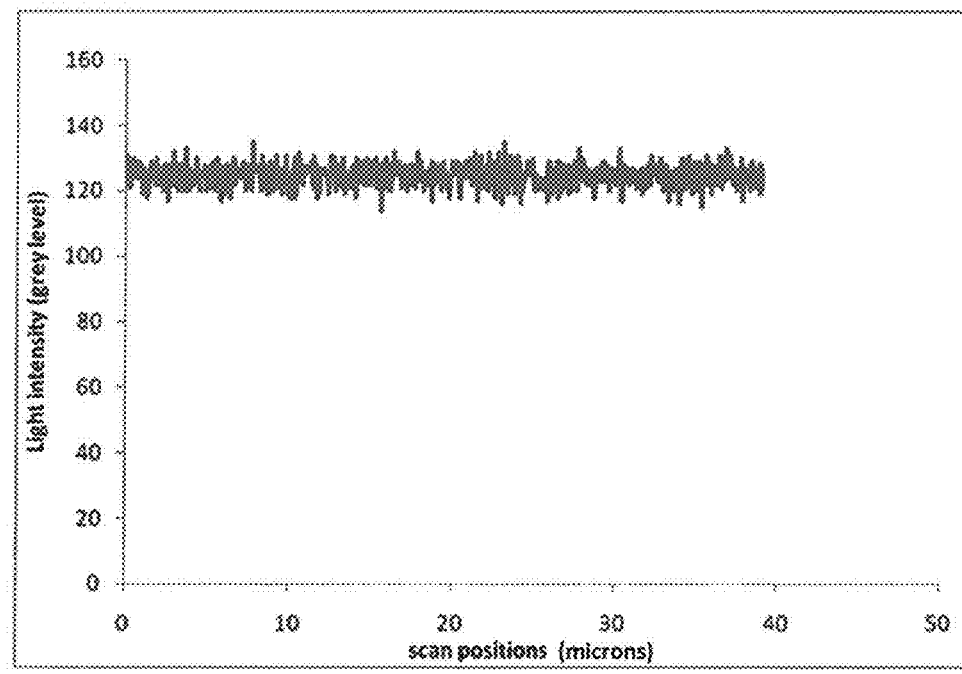
FIG. 5 is a single-pixel interferogram of one location on a paper surface, obtained for a position at which diffuse reflection is dominant, where the interferogram has no visible peak.

FIG. 5 shows an interferogram at another pixel where the reflection was predominately diffuse in character. Unlike the interferogram shown in FIG. 4, this interferogram exhibits very low fringe visibility, with no discernible peak. The lack of a discernible peak precludes the determination of the optical path difference, and thus the surface profile, at this location. This Figure demonstrates how interference fringes are not formed at most locations across the surface area when using scanning white light interferometry for the measurement of diffusely reflective surfaces, such as paper or paper-like materials.

The surface of paper essentially consists of pulp fibers. Accordingly, both a paper surface and a natural fiber surface are not perfectly flat at any scale. While scanning via white light interferometry, when the optical path difference of one pixel of the paper surface image is zero (phase difference=0), the optical path differences of adjacent pixels are usually different due to the rough nature of the fiber surface.

Figure 6:
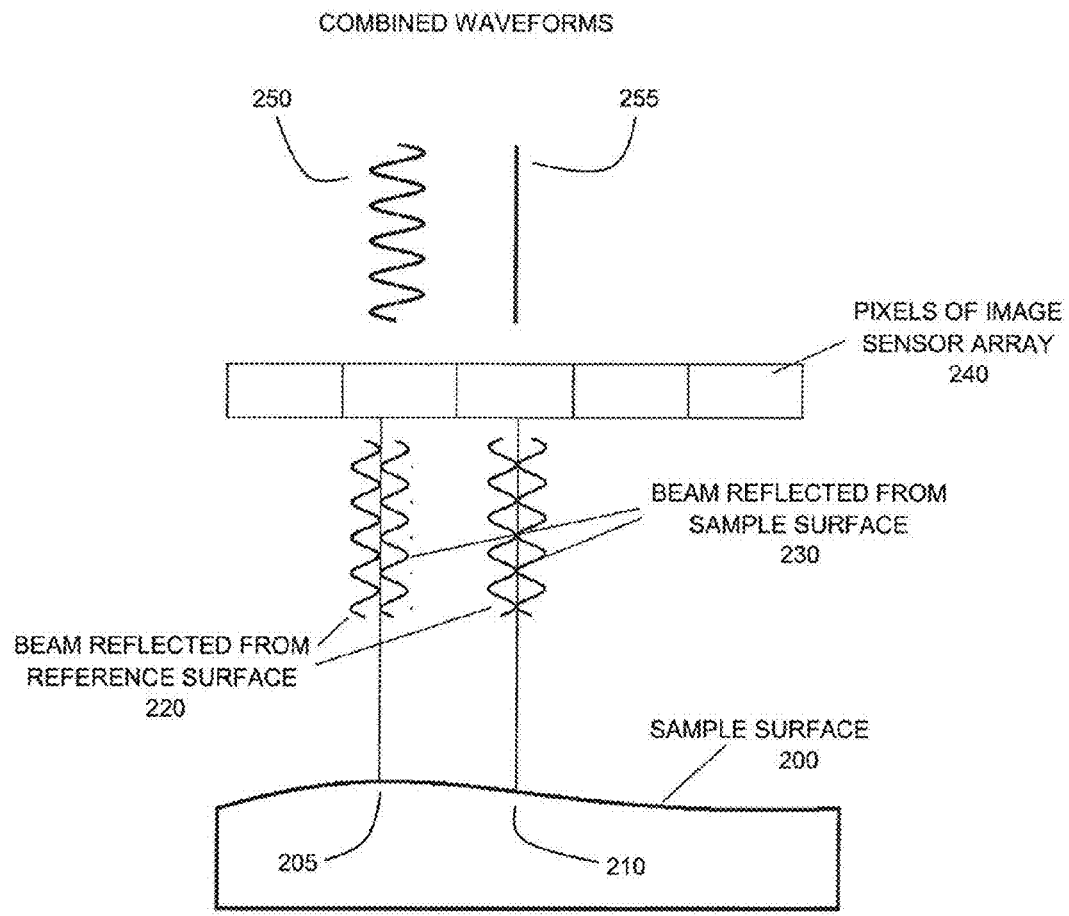
FIG. 6 is a diagram schematically illustrating the variation of light intensity between pixels adjacent to the pixel shown in FIG. 5.

This local variation in the optical path difference is schematically illustrated in FIG. 6, where interference from light reflected from positions 205 and 210 of sample surface 200 is shown. Positions 205 and 210 correspond to different pixels of image sensor array 240. At position 205, reflected reference beam 220 and reflected sample surface beam 230 are in phase and produce combined waveform 250 having a net signal. At nearby position 210, however, the surface profile has changed on the scale of the wavelength of the light, and reflected reference beam 220 and reflected sample surface beam 230 are out of phase, destructively interfering such that combined waveform 255 is minimized. As a result, the interference light intensity detected on adjacent pixels of the image sensor varies dramatically, even though the reflectance of the sample surface at corresponding locations is similar.

In some embodiments of the present disclosure, this local variation in the intensity of the combined waveform, when determined for different pixels, can be exploited in order to determine the position of zero optical path difference in a computationally efficient manner. This can be achieved by utilizing the variance in the detected light intensity within a region neighbouring a given pixel. When the dependence of this variance, for a given pixel, is considered as a function of the scanning position, the variance has been found to exhibit a peak value corresponding to the position at which the optical path difference equals zero. This method is less complex and less computationally intense that other methods of processing interference data from diffusely reflective surfaces.

Figure 7:
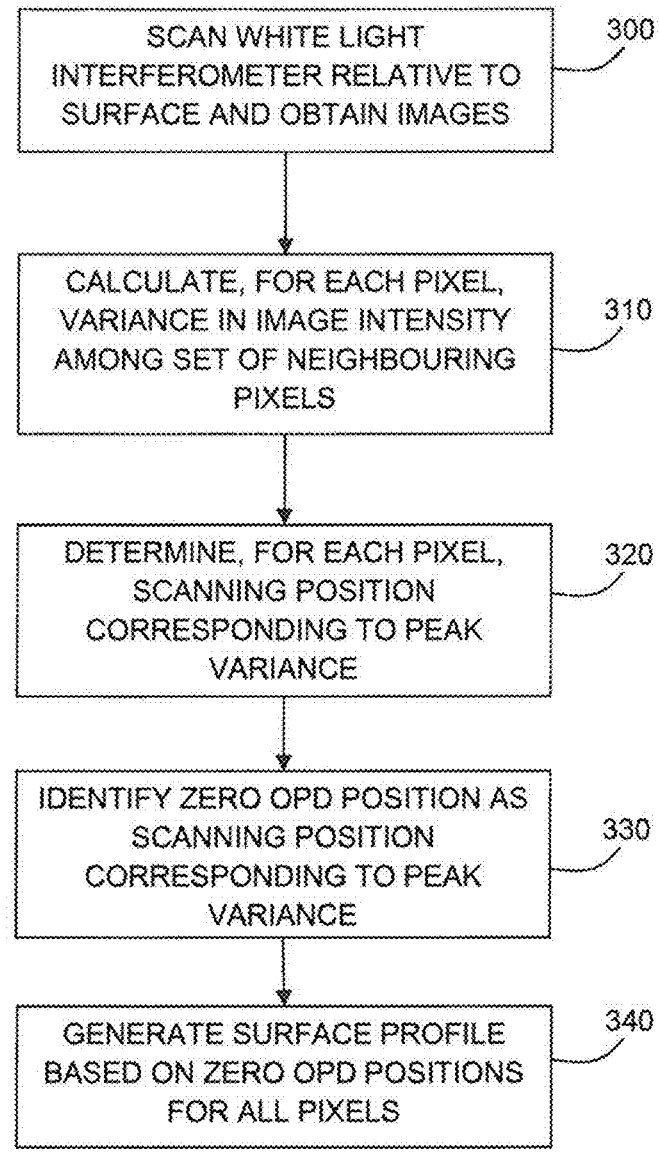
FIG. 7 is a flowchart illustrating an example method of calculating a spatial profile based on a calculation of intensity variance.

FIG. 7 shows a flow chart describing an example embodiment for calculating the surface topology of a diffusely reflecting surface, such as a paper surface, based on a series of images obtained using a scanning white light interferometry apparatus. In step 300, a white light scanning interferometer is employed to obtain a collection of images along a scanning direction. In step 310, for each image, a variance is calculated for each pixel, where the variance of a given pixel is obtained by including image values for a set of neighbouring pixels (optionally including the image value of the given pixel), thereby providing a variance value for each pixel in each image. The scanning position associated with the maximum variance of each pixel is then determined in step 320. The position of zero optical path difference is then determined to be the scanning position corresponding to the maximum variance, as shown in step 330. A surface profile may then be computed from the zero optical path difference positions determined for the pixels in step 340.

The surface profile may be plotted as a topography image. In some embodiments, the surface profile and/or the topography image may be smoothed to remove noise. The surface profile data may be employed to calculate the surface roughness.

Prior to calculating the position of zero OPD, the initial images in the lateral direction may be smoothed to remove high spatial frequency noise, for example, using a median filter or a Gaussian filter.

The variance of light intensity can be calculated using any of several known algorithms, such as derivative based, histogram-based, statistical based algorithms [1, 2]. The number of pixels sampled for the variance calculation is not limited to 5×5 (as shown in the examples), and may take on a wide range of values and configurations depending on the application and the surface that is being measured. Although several example embodiments described herein refer to the calculation of a two-dimensional variance within an image, it is to be understood that the variance may also be computed using intensity data from neighbouring pixels in one or more adjacent images, such that the variance is computed based on a local three-dimensional data set.

To determine the peak in variance at a location, the first order derivative of the variance series in the scan direction is calculated, for example, using the Savitzky-Golay filter. The peak in variance is then determined where the value of the first order derivative crosses zero. The scanning position at the peak as well as the variance at the peak is recorded. If there is no zero crossing of the derivative found, the point may be considered as an outlier and/or invalid. If the variance at the peak is less than a certain value, which is sample dependent, the point may also be considered to be an outlier and/or invalid. The location of OPD of all invalid points may be interoperated from the nearest valid points surrounding it using linear or polynomial interpolation. The constructed topography image may be smoothed using a low pass filter to remove high frequency noise.

Although the example embodiments disclosed above pertain to the determination of the surface profile on a per-pixel basis, it is to be understood that the method need not be performed with single-pixel resolution. For example, in other implementations, each variance measure, and each position of zero optical path difference, may be determined for a plurality of pixels. For example, the variance may be calculated by selecting a group of pixels (for example, four pixels), and computing the variance among pixels that neighbor this group of pixels. This would result in a lower resolution surface profile, but would increase the computational efficiency of the method and decrease the processing time of a given surface profile determination.

The embodiments described herein may be employed for the measurement of rough surfaces that have low spectral reflected intensity, without the need to perform complex mathematical analyses of low coherent interference fringes. In some example implementations, the methods disclosed herein may be employed for measuring surfaces with an RMS average roughness of approximately one micron or greater.

The embodiments disclosed herein may be employed for the measurement of surface topology of a wide variety of materials having different surface characteristics. In some embodiments, the preceding methods may be employed for the measurement of measuring paper, paperboard and paper-like materials that have low spectral reflection and low interferogram contrast. In other non-limiting examples, the sample may be non-coated paper made of natural pulp fibers, coated paper, textiles, woven and nonwoven materials, plastics, rubber, ceramics, wood, engineered wood products, polymer and polymer composite materials, and biological tissues.

Embodiments provided herein may provide improved sensitivity to off-axis measurements and/or misalignments, as the methods disclosed herein may be less sensitive to surface orientation (when compared to methods that depend on specular reflection), since the diffuse reflection will be more isotropic in nature.

The method proposed can also be combined with the conventional coherence scanning interferometry data processing method to improve the accuracy in surface topography construction. The scanned images may be processed to find out the surface location where clear interference fringe patterns are observed. These points may be compared with the values calculated using the peak of variance method. If the values of two methods disagree, the values from the conventional method may be treated as valid points. Valid points could be used for interpolating to replace the values of invalid points.

In some embodiments, the outliers in the variance data may be identified and treated as invalid points prior to final topography construction. For example, outliers may be identified by comparing the peak variance value (or the inferred surface height) to a threshold. The surface location of the outlier may be interpreted from surrounding valid points, for example, using interpretation such as linear or polynomial interpolation, or using a median filter. Examples of outliers include points where no zero crossing in the first order derivative of vertical variance series occur, points with very low variance peak values, and insolated points on the variance peak map caused by impulse noise.

It will be understood that the methods disclosed herein may find application for most natural materials, as their surfaces are rough in a large scale range, and therefore the interferogram intensity usually varies from location to location. For materials having an ultra-smooth surface, as long as the surface is aligned to record the scanning beam, the interferogram intensity variation still occurs, and the methods provided herein may be employed.

The ability of the present methods to perform measurements in the presence of surface discontinuities (or high slopes) may depend on the numeric aperture of the objective lens used. For example, when the workpiece has features with large local slopes on the surface, and the specular reflection dominates, the face of the slope acts as a mirror reflecting the light outside of the objective lens. However, as in the case of materials having a diffusely reflecting surface, a substantial amount of light may be reflected towards the objective lens, and thus the maximum measurable slope may exceed that of conventional methods.

Figure 8:
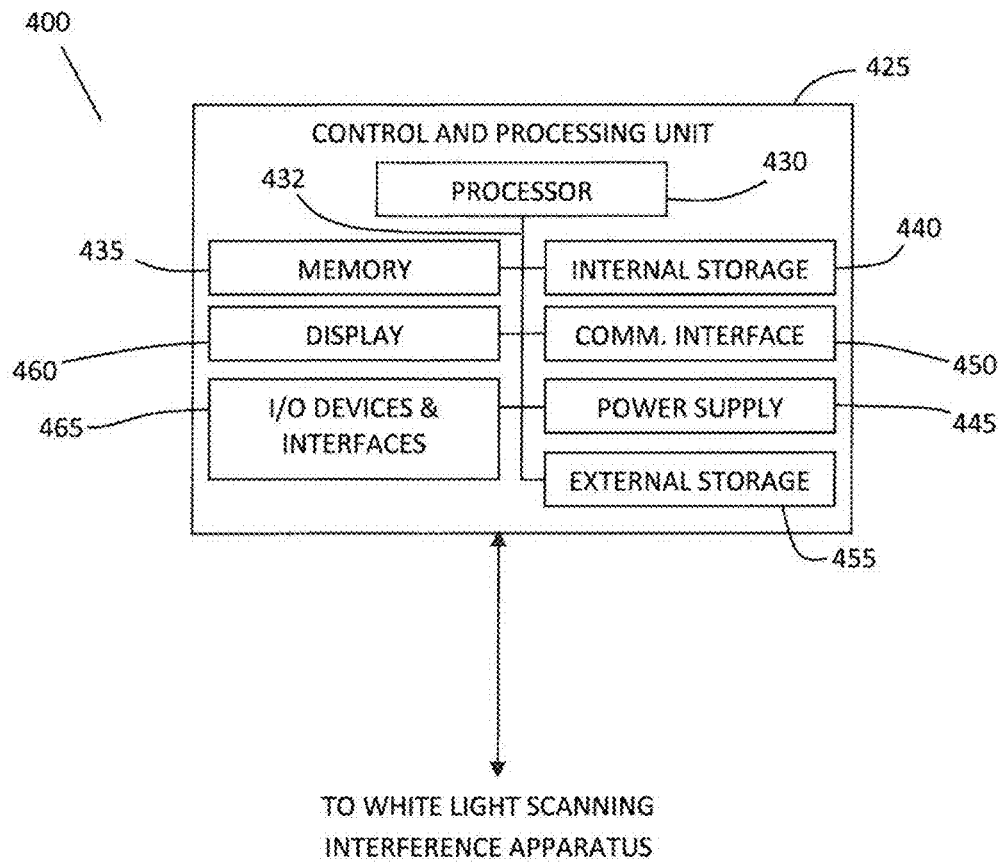
FIG. 8 is a block diagram illustrating an example computing system for performing selected embodiments.

FIG. 8 illustrates a block diagram of an example computing system 400 that may be employed to perform various methods according to the embodiments provided in the present disclosure. Control and processing unit 425, which is described in further detail below, may be employed for the processing of images obtained by the white light scanning interference apparatus, and optionally for the control of the white light scanning interference apparatus. For example, computer 5 in FIG. 1 may be substituted with computing system 400 for implementing various embodiments disclosed herein.

Some aspects of the present disclosure can be embodied, at least in part, in software. For example, the method steps disclosed in FIG. 7, or variations thereof as per alternative and/or additional embodiments, may be performed by a processor according to instructions provided in software or firmware. That is, the techniques can be carried out in a computer system or other data processing system in response to its processor, such as a microprocessor, executing sequences of instructions contained in a memory, such as ROM, volatile RAM, non-volatile memory, cache, magnetic and optical disks, or a remote storage device. Further, the instructions can be downloaded into a computing device over a data network in a form of compiled and linked version. Alternatively, the logic to perform the processes as discussed above could be implemented in additional computer and/or machine readable media, such as discrete hardware components as large-scale integrated circuits (LSI's), application-specific integrated circuits (ASIC's), or firmware such as electrically erasable programmable read-only memory (EEPROM's) and field-programmable gate arrays (FPGAs).

FIG. 8 provides an example implementation of control and processing unit 425, which includes one or more processors 430 (for example, a CPU/microprocessor), bus 432, memory 435, which may include random access memory (RAM) and/or read only memory (ROM), one or more internal storage devices 440 (e.g. a hard disk drive, compact disk drive or internal flash memory), a power supply 445, one more communications interfaces 450, external storage 455, a display 460 and various input/output devices and/or interfaces 465.

Although only one of each component is illustrated in FIG. 8, any number of each component can be included in the control and processing unit 425. For example, a computer typically contains a number of different data storage media. Furthermore, although bus 432 is depicted as a single connection between all of the components, it will be appreciated that the bus 432 may represent one or more circuits, devices or communication channels which link two or more of the components. For example, in personal computers, bus 432 often includes or is a motherboard.

In one embodiment, control and processing unit 425 may be, or include, a general purpose computer or any other hardware equivalents. Control and processing unit 425 may also be implemented as one or more physical devices that are coupled to processor 430 through one of more communications channels or interfaces. For example, control and processing unit 425 can be implemented using application specific integrated circuits (ASICs). Alternatively, control and processing unit 425 can be implemented as a combination of hardware and software, where the software is loaded into the processor from the memory or over a network connection.

Control and processing unit 425 may be programmed with a set of instructions which when executed in the processor causes the system to perform one or more methods described in the disclosure. Control and processing unit 425 may include many more or less components than those shown.

While some embodiments have been described in the context of fully functioning computers and computer systems, those skilled in the art will appreciate that various embodiments are capable of being distributed as a program product in a variety of forms and are capable of being applied regardless of the particular type of machine or computer readable media used to actually effect the distribution.

A computer readable medium can be used to store software and data which when executed by a data processing system causes the system to perform various methods. The executable software and data can be stored in various places including for example ROM, volatile RAM, non-volatile memory and/or cache. Portions of this software and/or data can be stored in any one of these storage devices. In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., compact discs (CDs), digital versatile disks (DVDs), etc.), among others. The instructions can be embodied in digital and analog communication links for electrical, optical, acoustical or other forms of propagated signals, such as carrier waves, infrared signals, digital signals, and the like.

The method proposed can also be used with other types of optical surface topography measurement systems, such as, but not limited to, focus variation instruments, point autofocus instruments, imaging devices such as cameras, imaging confocal microscopy, endoscopic imaging devices, and other optical systems and devices.

The following examples are presented to enable those skilled in the art to understand and to practice embodiments of the present disclosure. They should not be considered as a limitation on the scope of the present embodiments, but merely as being illustrative and representative thereof.

EXAMPLES

Figure 9:
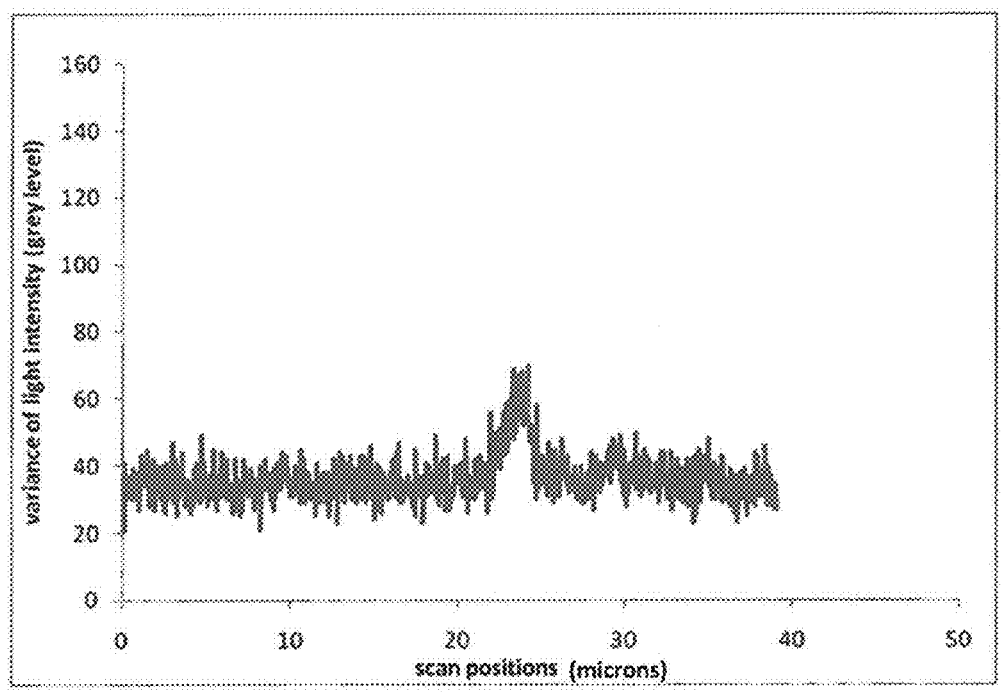
FIG. 9 shows the variance of the light intensity calculated for pixels adjacent to the pixel shown in FIG. 5, plotted as a function of scanning position.

The aforementioned embodiments are demonstrated, by way of example, in FIG. 9, which shows the dependence of the lateral variance of light intensity distribution along the scanning direction for the same pixel as shown in FIG. 5. The lateral variance was calculated for each scanning position by selecting a set of pixels neighbouring a given pixel (optionally including the given pixel) and computing the variance of the intensities recorded among the set of pixels. In other words, the variance for a given pixel was determined by applying a variance filter to a region surrounding the pixel. In the example implementation shown in FIG. 9, the variance was calculated on a 5×5 array of pixels around the selected pixel. As can be seen in FIG. 9, a peak in the variance values is clearly observable. The position for which the optical path difference equals zero was determined based on the scanning position corresponding to the peak variance. The positions of zero optical path difference were then employed to determine the surface profile, which may be plotted as a topography image.

In the present example, the measured interference images were smoothed prior to determining the variance and identifying the variance peak locations. The interference images were smoothed via a median filter, which may be a unidirectional filter, by which the center pixel of a given region (e.g. 5×5 pixel region) of an image may be replaced by the median of the pixels within this region. The smoothed image of FIG. 3, according to a 5×5 pixel region unidirectional median filter, is shown in FIG. 10.

Figure 10:
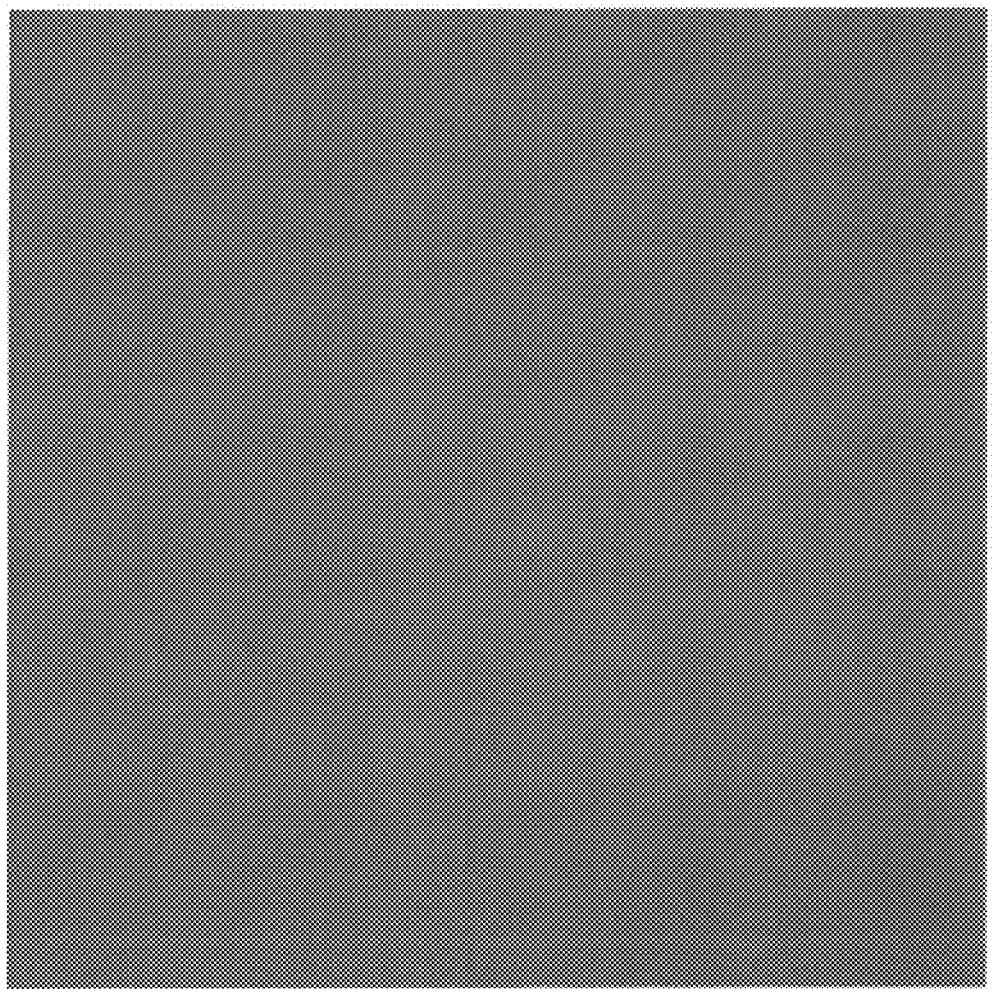
FIG. 10 is a smoothed version of the image shown in FIG. 3, after the application of a 5×5 pixel unidirectional median filter.
Figure 11:
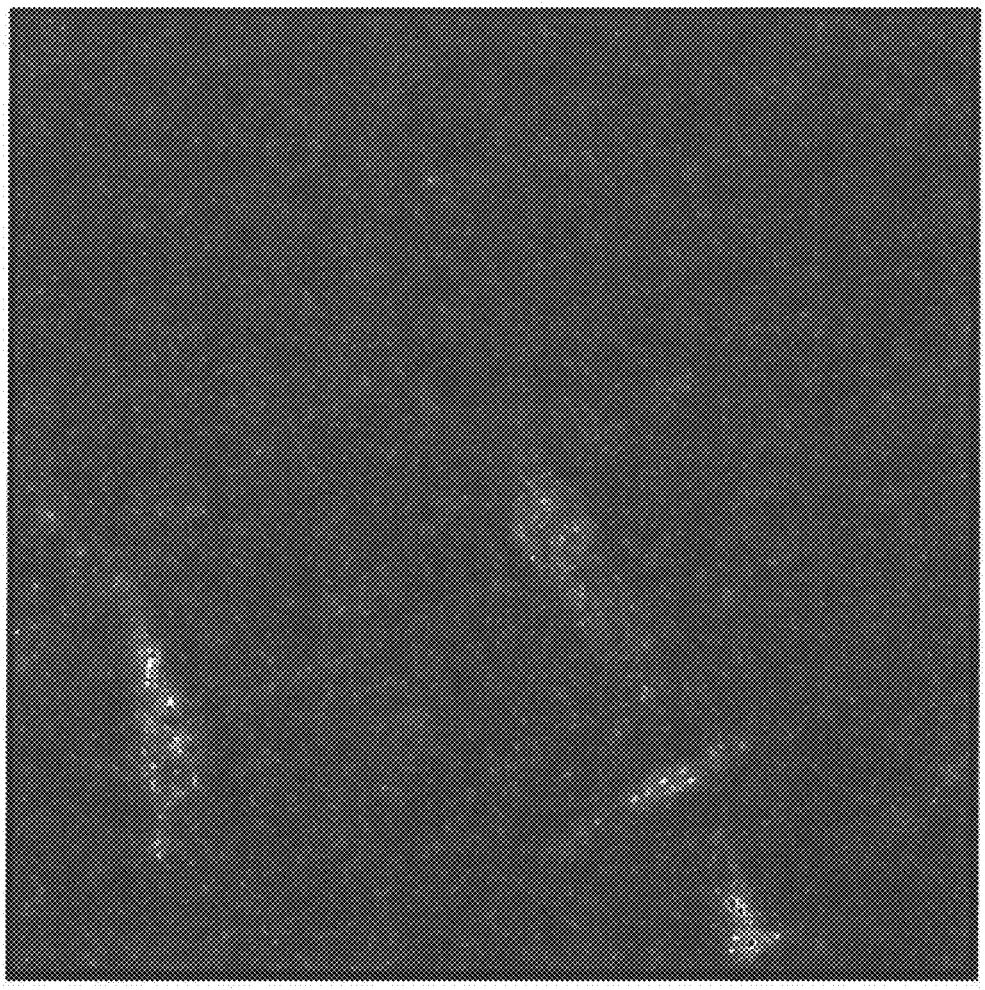
FIG. 11 is an image showing the computed variance of each pixel in FIG. 10.
Figure 12:
FIG. 12 a topography image of a paper surface obtained by associating the peak variance positions with the zero optical path length position.

FIG. 11 shows the result of the application of the variance filter to the smoothed image of FIG. 10, where the variance filter involved a 5×5 region. FIG. 12 is a topography image obtained after identifying the position corresponding to the variance peak for each pixel, and equating this position to the zero optical path difference position.

Figure 13:
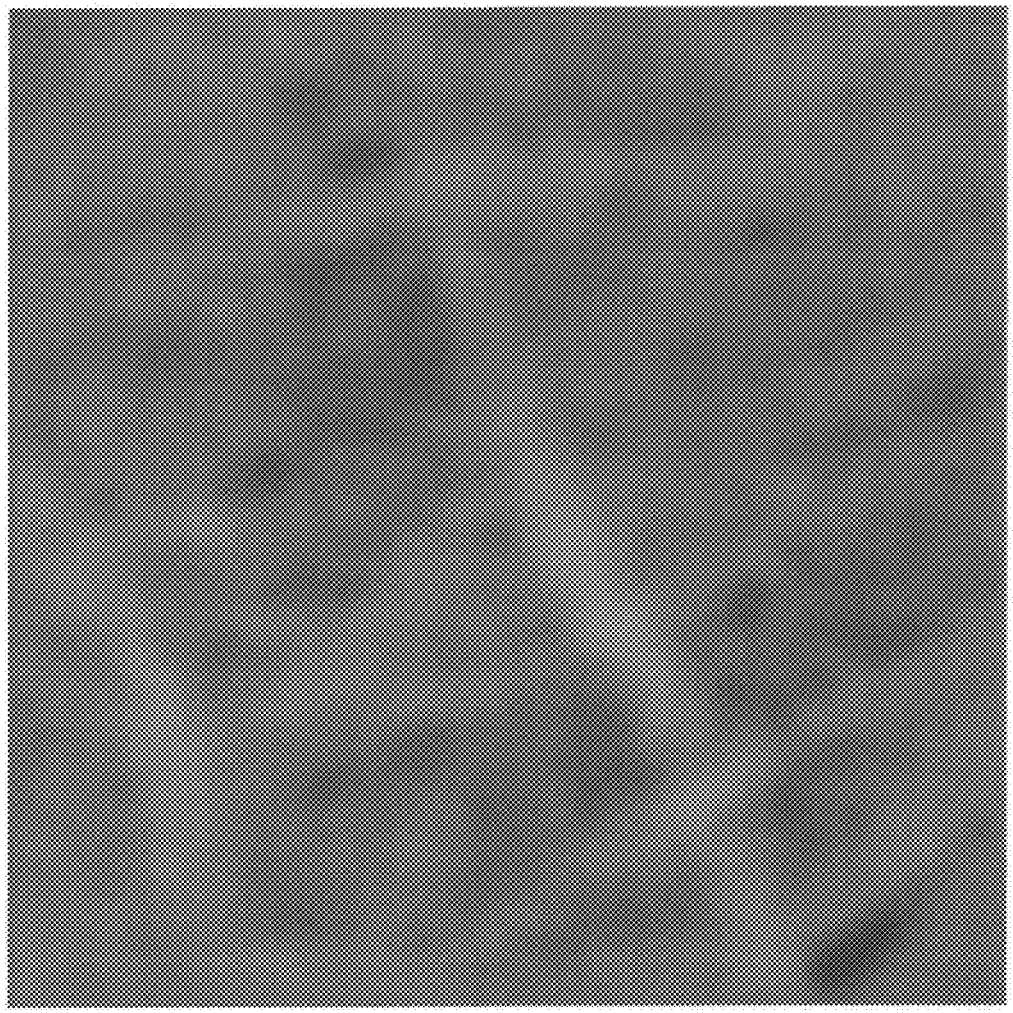
FIG. 13 is a smoothed topography image based on the image shown in FIG. 12.
Figure 14:
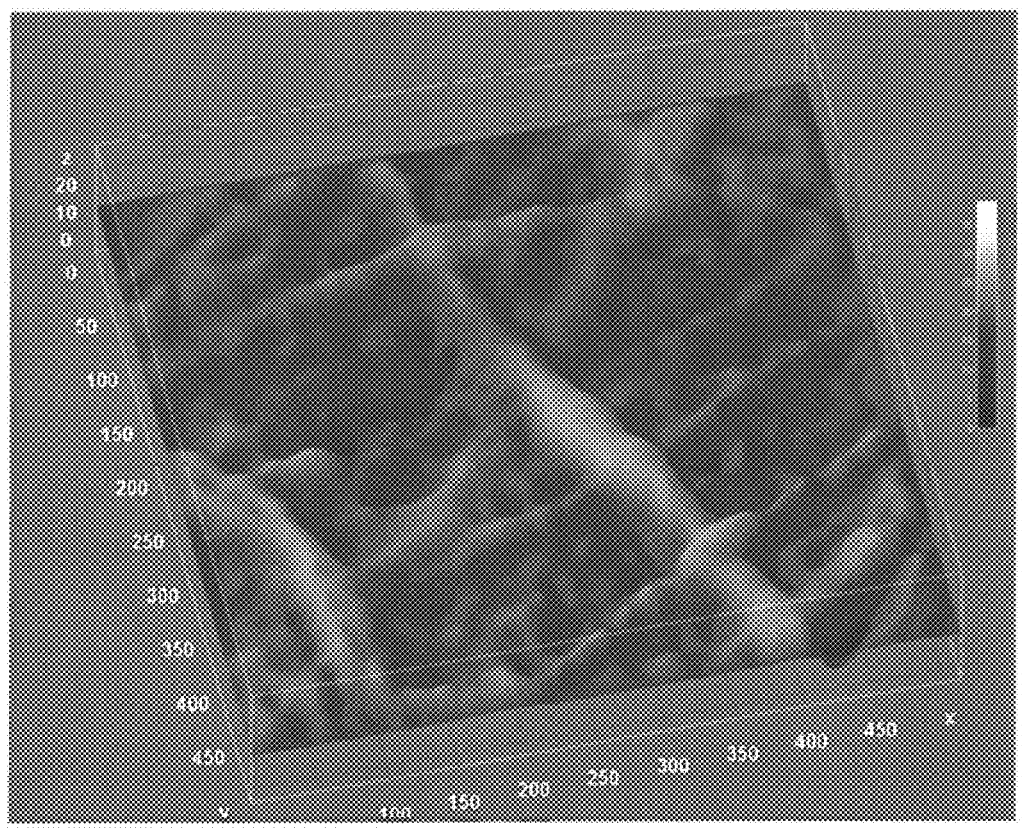
FIG. 14 is a 3D view of the smoothed topography image from FIG. 13.

The topography image was subsequently smoothed to produce the image shown in FIG. 13. The smoothing algorithm involved the convolution with a Gaussian function:

$$G(x, y) = \frac{1}{2\pi\sigma^2} e^{\frac{x^2+y^2}{2\sigma^2}}, \tag{1}$$

with a radius of 8 pixels [3]. A three dimensional plot of the surface profile is shown in FIG. 14, clearly revealing a rich surface structure on the micron scale.

Figure 15:
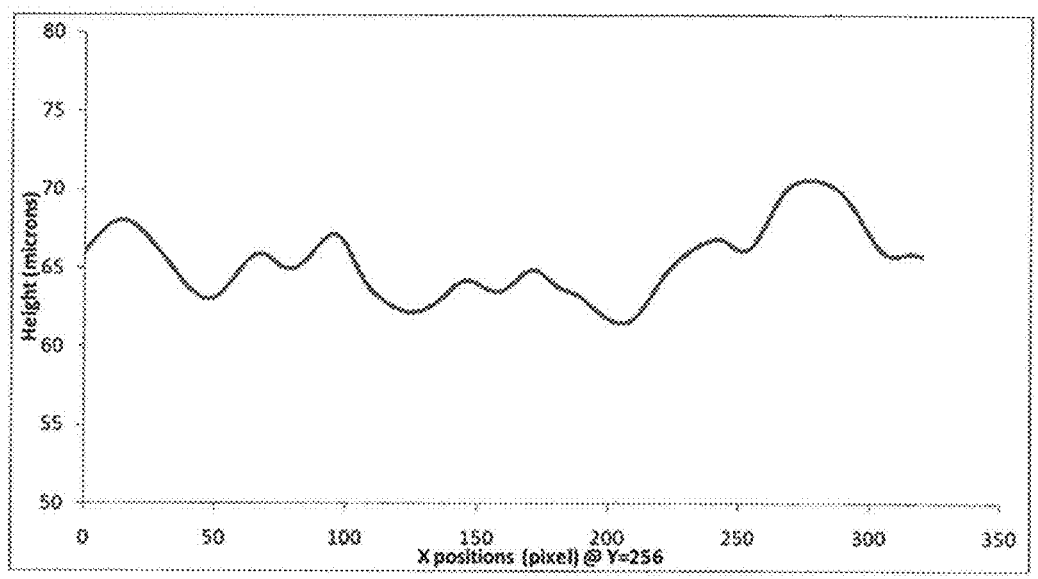
FIG. 15 is a line profile of a location on the topography image from FIG. 13.

FIG. 15 shows a line profile of the height map across the x-direction at a value of Y=256, which can be employed for calculating RMS roughness.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

REFERENCES

1. Sun, Y., Duthaler, S., and Nelson, B. J., "Autofocusing in Computer Microscopy: Selecting the Optimal Focus Algorithm", 65: 139-149, Microscopy Research and Technique, (2004).
2. Frans C. A. Groen, Ian T. Young, and Guido Ligthart, "A Comparison of Different Focus Functions for Use in Autofocus Algorithms" 6:81-91, Cytometry, (1985)
3. Shapiro, L. G. & Stockman, G. C: "Computer Vision", page 137, 150. Prentice Hall, 2001.

Therefore what is claimed is:

1. A method of calculating a zero optical path difference position associated with a selected pixel of a white light interferometry system when measuring a sample surface, the method comprising:
    a) directing a white light beam onto the sample surface and scanning the white light interferometry system to vary an optical path difference between a reference beam and a reflected beam while measuring interference images obtained based on interference between the reflected beam and the reference beam;
    b) calculating, for a plurality of the white light interference images, the variance of the interference intensity among pixels neighbouring the selected pixel;
    c) processing the variance values to obtain a position associated with a peak variance; and
    d) associating the position of peak variance with the zero optical path difference position.

2. The method according to claim 1 wherein the sample surface is diffusively reflective, and wherein an interferogram associated with the selected pixel is absent of a discernable peak.

3. The method according to claim 1 further comprising repeating steps b) through d) for a plurality of additional selected pixels, and computing a surface topography image based on the calculated zero optical path difference data for the plurality of additional selected pixels.

4. The method according to claim 3 further comprising smoothing the interference images prior to calculating the variance.

5. The method according to claim 3 further comprising smoothing the zero optical path difference data prior to computing the surface topography image.

6. The method according to claim 1 wherein the interference intensity values are obtained, for a given interference image, from interference intensity values of neighbouring pixels within the given interference image.

7. The method according to claim 6 wherein the interference intensity values are further obtained, for a given interference image, from interference intensity values of neighbouring pixels within one or more adjacent interference images.

8. The method according to claim 1 wherein the peak variance is calculated by calculating a first order derivative of the variance series in the scan direction, and determining the position corresponding to the zero crossing of the first order derivative.

9. The method according to claim 1 further comprising comparing the variance or the calculated zero optical path difference position with a pre-selected threshold for identifying an outlier.

10. The method according to claim 1 wherein the sample is paper or paperboard.

11. The method according to claim 10 wherein the paper is coated paper or non-coated paper.

12. The method according to claim 1 wherein the sample is selected from the group consisting of textiles, woven and nonwoven materials, plastics, rubber, ceramics, wood, engineered wood products, polymer and polymer composite materials, and biological tissues.

13. A method of processing interference images from a white light scanning interferometer to determine a zero optical path difference position associated with a selected pixel, the method comprising:
    a) calculating, for a plurality of the white light interference images obtained along a scanning direction, the variance of the interference intensity among pixels neighbouring the selected pixel;
    b) processing the variance values to obtain a position associated with a peak variance; and
    c) associating the position of peak variance with the zero optical path difference position.

14. The method according to claim 13 wherein an interferogram associated with the selected pixel is absent of a discernable peak.

15. The method according to claim 13 further comprising repeating steps a) through c) for a plurality of additional selected pixels, and computing a surface topography image based on the calculated zero optical path difference data for the plurality of additional selected pixels.

16. The method according to claim 15 further comprising smoothing the interference images prior to calculating the variance.

17. The method according to claim 15 further comprising smoothing the zero optical path difference data prior to computing the surface topography image.

18. The method according to claim 13 wherein the interference intensity values are obtained, for a given interference image, from interference intensity values of neighbouring pixels within the given interference image.

19. The method according to claim 18 wherein the interference intensity values are further obtained, for a given interference image, from interference intensity values of neighbouring pixels within one or more adjacent interference images.

20. The method according to claim 13 wherein the peak variance is calculated by calculating a first order derivative of the variance series in the scan direction, and determining the position corresponding to the zero crossing of the first order derivative.

21. The method according to claim 13 further comprising comparing the variance or the calculated zero optical path difference position with a pre-selected threshold for identifying an outlier.

22. An optical apparatus for measuring a surface profile, the apparatus comprising:
    a scanning white light interferometer; and
    a processor configured to:
        a) receive interference images from the scanning white light interferometer;
        b) calculate, for a plurality of the white light interference images obtained along a scanning direction, the variance of the interference intensity among pixels neighbouring a selected pixel;
        c) process the variance values to obtain a position associated with a peak variance; and
        d) associate the position of peak variance with the zero optical path difference position.

23. The optical apparatus according to claim 22, wherein the processor is further configured to:
    repeat steps b) through d) for a plurality of additional selected pixels; and compute a surface topography image based on the calculated zero optical path difference data for the plurality of additional selected pixels.

* * * * *